(12) United States Patent
Bowser

(10) Patent No.: US 10,412,931 B2
(45) Date of Patent: Sep. 17, 2019

(54) POWER LIFT PLATFORM

(71) Applicant: George Bowser, Greenville, OH (US)

(72) Inventor: George Bowser, Greenville, OH (US)

( * ) Notice: Subject to any disclaimer, the term of this patent is extended or adjusted under 35 U.S.C. 154(b) by 190 days.

(21) Appl. No.: 15/699,712

(22) Filed: Sep. 8, 2017

(65) Prior Publication Data
US 2018/0084756 A1 Mar. 29, 2018

Related U.S. Application Data

(60) Provisional application No. 62/400,110, filed on Sep. 27, 2016.

(51) Int. Cl.
*A01K 13/00* (2006.01)
*B66F 7/06* (2006.01)

(52) U.S. Cl.
CPC ............ *A01K 13/00* (2013.01); *B66F 7/065* (2013.01); *B66F 7/0625* (2013.01)

(58) Field of Classification Search
CPC ....... A01K 13/00; B66F 7/0625; B66F 7/065; B66F 7/08; B62B 2205/06; B62B 2205/003; B62B 1/042; B62B 1/208
See application file for complete search history.

(56) References Cited

U.S. PATENT DOCUMENTS

| | | | |
|---|---|---|---|
| 2,902,976 A | 9/1959 | Wilson | |
| 4,712,653 A * | 12/1987 | Franklin | B66F 7/08 108/145 |
| 5,887,302 A * | 3/1999 | DiMucci | A61G 1/04 318/443 |
| 7,013,839 B2 * | 3/2006 | Lynch | A01K 13/00 119/753 |
| 7,207,295 B2 * | 4/2007 | Lynch | A01K 13/00 119/753 |
| 7,946,253 B2 * | 5/2011 | Smith | A01K 13/001 119/756 |
| 9,999,489 B1 * | 6/2018 | Kern, Sr. | B66F 7/08 |
| 2002/0043259 A1 * | 4/2002 | Brennan | A47J 37/0763 126/41 R |
| 2003/0150657 A1 * | 8/2003 | Shupp | B60T 7/16 180/168 |
| 2010/0012909 A1 * | 1/2010 | Lee | B66F 7/065 254/93 R |
| 2014/0027693 A1 * | 1/2014 | Hallman | B66F 5/00 254/8 C |
| 2016/0280246 A1 * | 9/2016 | Pino | B66F 5/02 |

* cited by examiner

*Primary Examiner* — Michael C McCullough
(74) *Attorney, Agent, or Firm* — R. William Graham

(57) ABSTRACT

A power lift platform includes a scissors frame arrangement having a first pair of parallel frame members and a second pair of parallel frame members pivotally connected to the first pair of parallel frame members defining an upper part and lower part for each of the frame members about the pivotal connection. A platform is attached to upper parts of the first and second pairs of parallel frame members. An axle is operably connected to a lower part of each of the first pair of parallel frame members. A pair of wheels operably connect to the axle. A first cross bar connects to a lower part of each of the second pair of parallel frame members. A rechargeable battery is operably disposed on a second cross bar. A electric linear actuator pivotally interconnects the second cross member and a third cross members by way of bracket and pivot pin connection.

10 Claims, 6 Drawing Sheets

POWER LIFT PLATFORM

FIELD OF INVENTION

The present invention relates generally to methods and equipment for power lifts. More particularly, the invention relates to a power lift platform for use as an animal stand used for use with livestock and has applications for use as general work platform.

PRIOR ART

There exist various types of lifts. More particularly, some of these lifts are used as stands for showing animals and for attending to trimming and grooming the same. These are commonly used in the livestock industry for maintenance or show of animals like sheep, goats, swine, dogs or other animals or livestock. Lift stands raise the animal to a height that provides better access to the animal for grooming and viewing.

Examples of such stands are seen in U.S. Pat. Nos. 7,946,253, 7,207,295, 7,013,839, and 2,902,976. These stands have provided improvements in the field. Improvements in the field have focused on raising the platform of the stand to a position that provides easy access to the animal for maintenance or show of the animal.

Ideally these stands should be transportable and able to accommodate the weight of some rather large animals. Some stands include a set of wheels at one end to permit it to be rolled to a desired location where the animal is then walked onto the stand.

There remains a need to improvement these stands. The present invention provides improvements to stands thereby making them more user friendly in good or inclement environment conditions.

SUMMARY OF THE INVENTION

It is an object to improve lifts.
It is a further object to provide a power lift.
It is an object to improve animal stands.
It is another object to provide a battery powered animal stand.

Accordingly, the present invention is directed to a power lift platform. The power lift platform includes a scissors frame arrangement having a first pair of parallel frame members and a second pair of parallel frame members pivotally connected to the first pair of parallel frame members defining an upper part and lower part for each of the frame members about the pivotal connection. A platform is attached to upper parts of the first and second pairs of parallel frame members. An axle is operably connected to a lower part of each of the first pair of parallel frame members. A pair of wheels operably connect to the axle. A first cross bar connects to a lower part of each of the second pair of parallel frame members.

A second cross bar connects between and to lower parts of the first pairs of parallel frame members upward from and adjacent the axle. A rechargeable battery is operably disposed on the second cross bar.

A third cross bar connects between and to upper parts of the second pairs of parallel frame members. An electric linear actuator pivotally interconnects the second and third cross bars. A reverse polarity switch is operably connected to the stand, preferably underneath the platform, for controlling power of the battery and the extension and contraction of the actuator. Thus, the platform is selectively positionable between a lowered position and a raised position.

The lower part of one of the first frame members includes one or more stop surfaces. A brace is provided having a first end pivotally connected to the upper part of one of the frame members and has a free second end which can be selectively seated against one of the stop surfaces to provide support.

In the case of the invention's use an an animal stand, a head harness is connected to the frame assembly. Preferably, the harness is removably connected and height adjustable.

Also, there are a plurality of stake holders disposed about a periphery of the platform. Stakes can be inserted into the stake holders to retain an animal in position on the platform.

In another aspect, the present invention relates to a method of using a power lift platform, the method includes loading an animal onto the platform of the power lift platform, and raising the platform to a raised position using the switch. Upon reaching the desired height, positioning the second end of the brace against the stop.

The embodiment set forth in part in the description that follows is exemplary. The aspects of the disclosure may relate to individual features as well as combinations of features. It is to be understood that both the foregoing general description and the following detailed description are explanatory only, and are not restrictive of the claimed invention.

DETAILED DESCRIPTION OF PREFERRED EMBODIMENT

Figure 1:
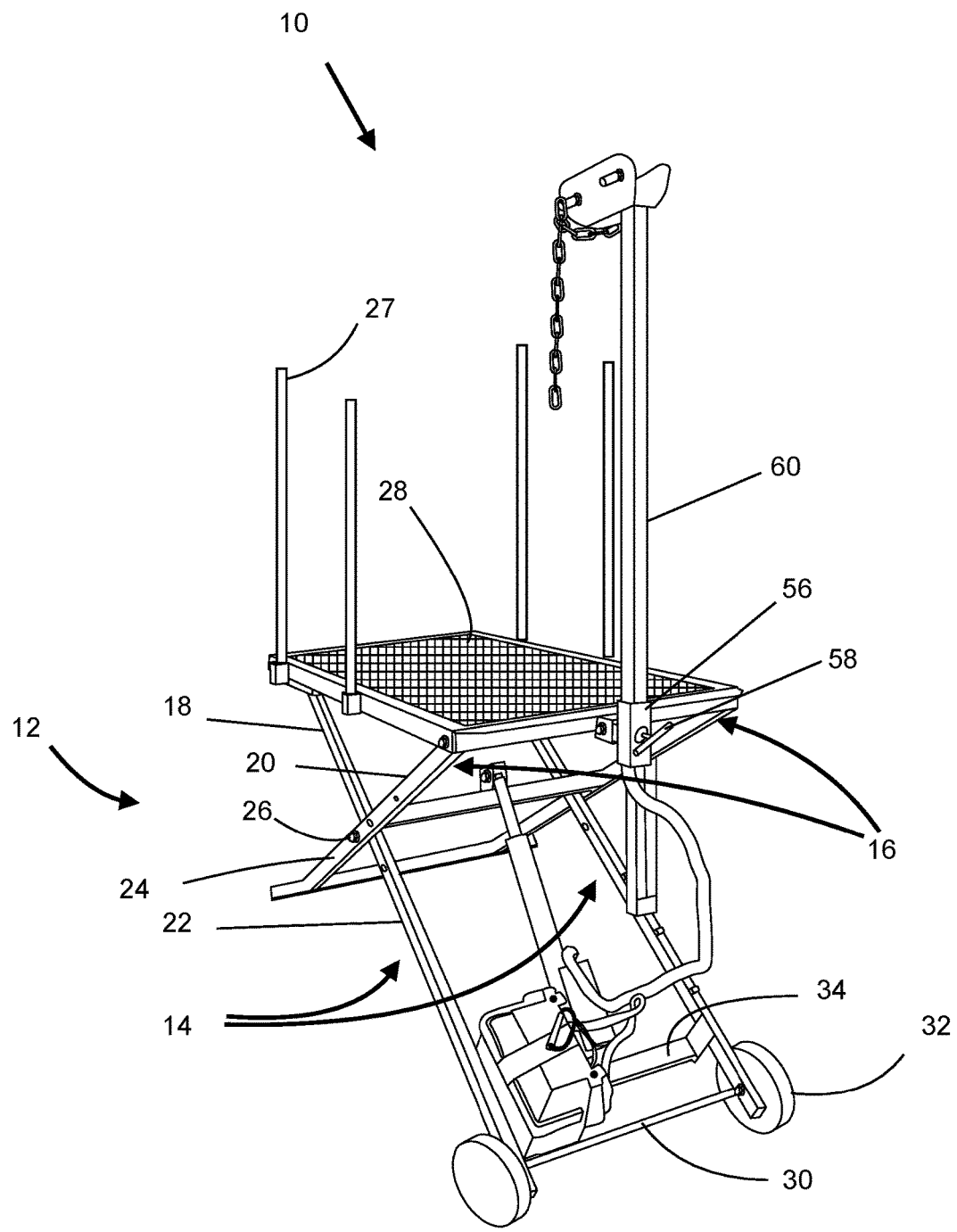
FIG. 1 is side perspective view of the instant invention in a raised position.
Figure 2:
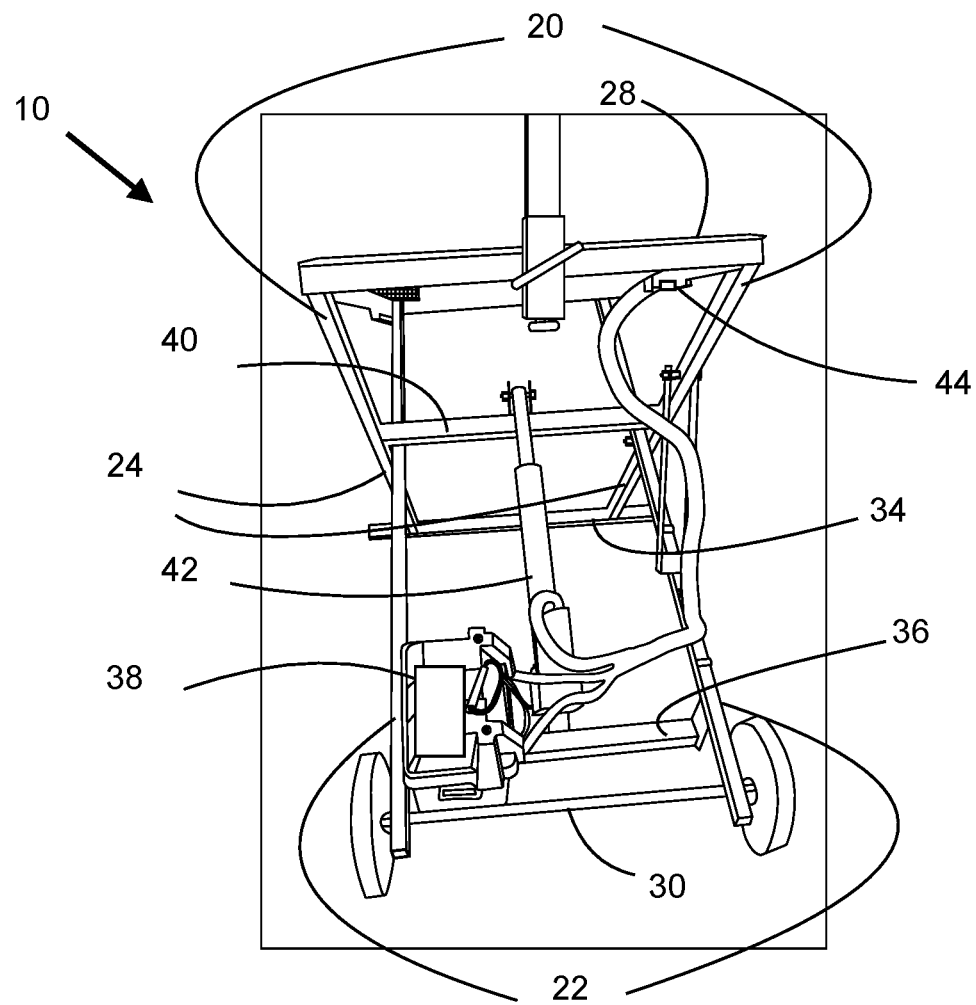
FIG. 2 is a front end view of the invention in a raised position.
Figure 3:
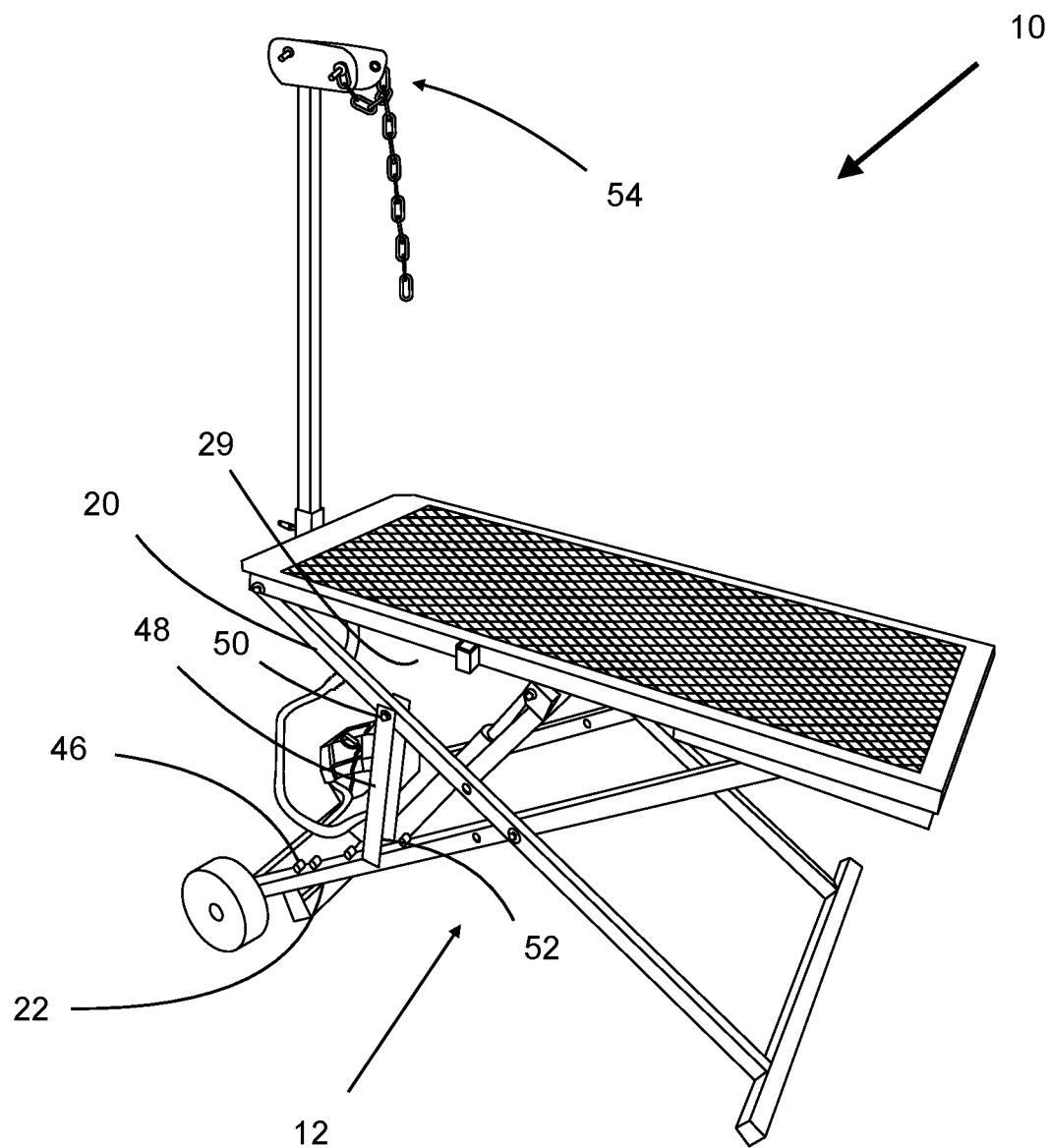
FIG. 3 is a side perspective view of the invention is a raised position.
Figure 4:
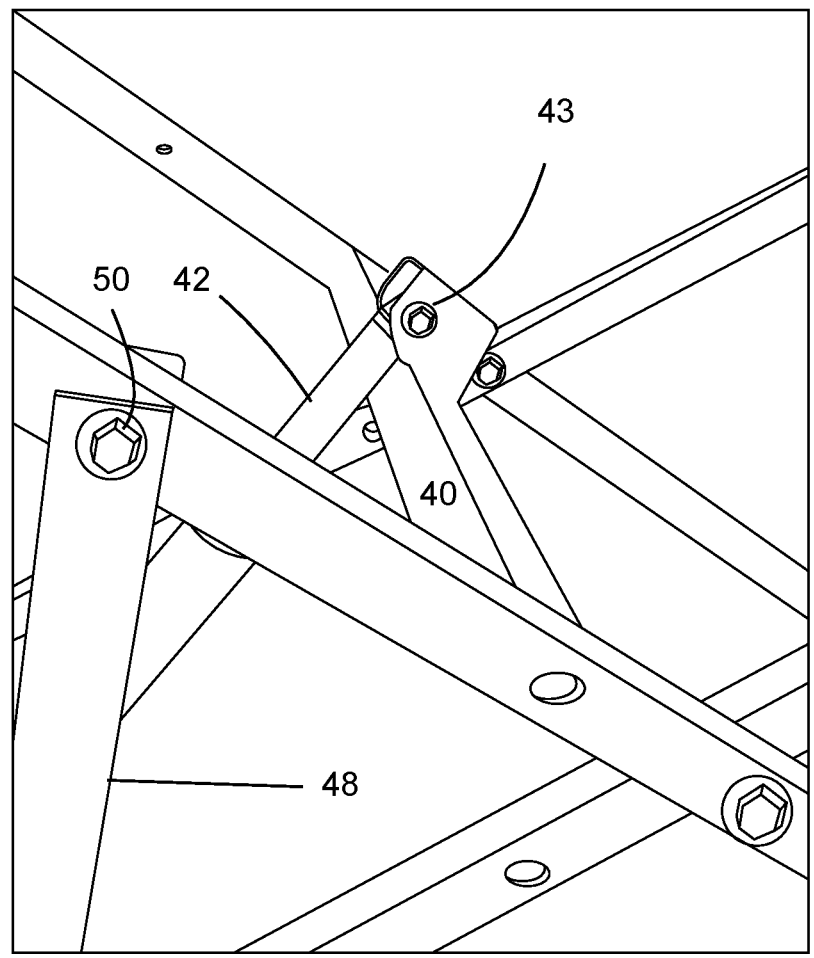
FIG. 4 is a side perspective view of a part of the invention in a raised position.
Figure 5:
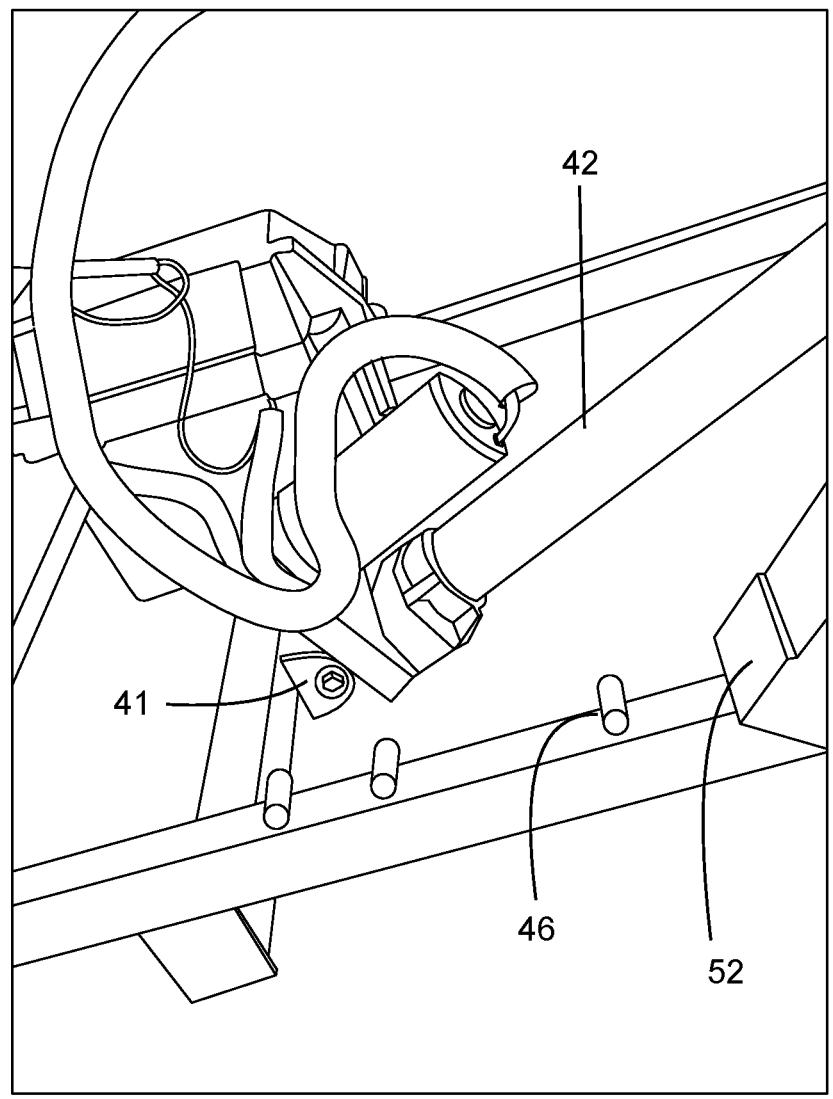
FIG. 5 is a side perspective view of a lower part of the invention is a raised position.
Figure 6:
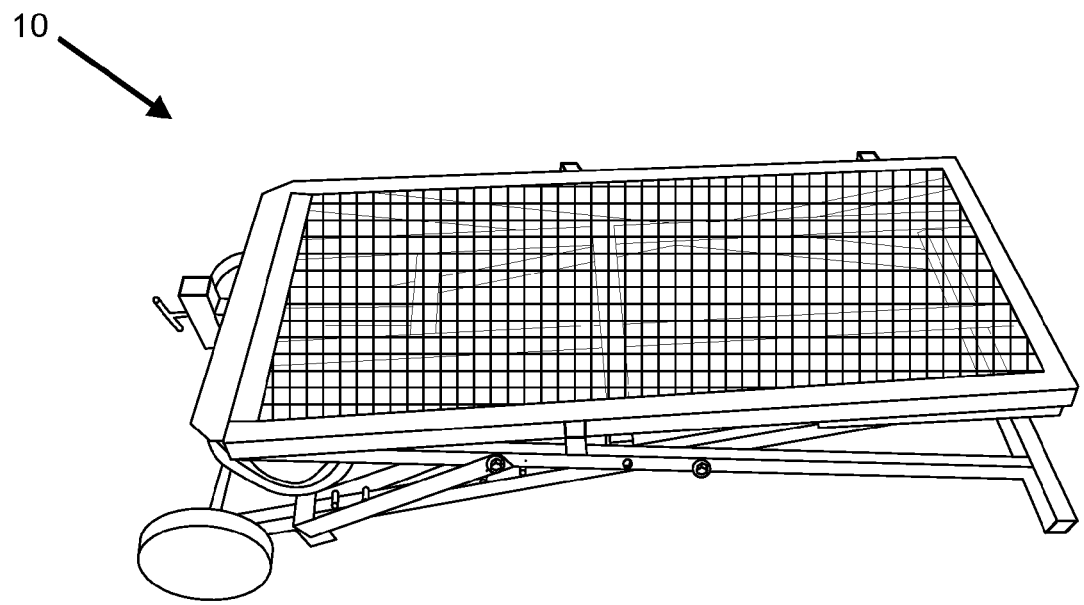
FIG. 6 is a side perspective view of the invention is a lowered position.

Referring now to the drawings, a power lift platform of the instant invention is generally referred to by the numeral 10. The invention will now be described in detail to various features of the present disclosure that are illustrated in the accompanying drawings. Wherever possible, the same reference numbers will be used throughout the drawings to refer to the same or like parts.

The power lift platform 10 includes a scissors frame arrangement 12 having a first pair of parallel frame members 14 and a second pair of parallel frame members 16 pivotally connected to the first pair of parallel frame members 14 defining an upper part 18, 20 and lower part 22, 24 or each of the frame members 14, 16, respectively about the pivotal connection 26. A platform 28 is attached to upper parts 18 and 20 of the first and second pairs of parallel frame members 14 and 16, respectively. There are a plurality of stake holders 29 disposed about a periphery of the platform 28. Stakes or posts 27 can be inserted into the stake holders 29 to retain an animal in position on the platform 28.

An axle 30 is operably connected to lower part 22, 24 of each of the first pair of parallel frame members 14, 16, respectively. A pair of wheels 32 operably connect to the axle 30.

A first cross bar 34 connects to lower part 24 of each of the second pair of parallel frame members 20. A second cross bar 36 connects between and to lower parts 22 of the first pairs of parallel frame members 14 upward from and adjacent the axle 30. A rechargeable battery 38 is operably disposed on the second cross bar 36.

A third cross bar 40 connects between and to upper parts 20 of the second pairs of parallel frame members 16. A electric linear actuator 42 pivotally interconnects the second cross bar 36 and third cross bar 40 by way of bracket and pivot pin (or bolt and nut) connections 41 and 43, respectively, for example. Preferably, the electric linear actuator 42 is centrally mounted. A reverse polarity switch 44 is operably connected to the stand 10, preferably underneath the platform 28, for controlling power of the battery 38 and the extension and contraction of the actuator 42. Thus, the platform 28 is selectively pivotable between a lowered position and a raised position.

The lower part 22 of one of the first frame members 14 includes one or more stop surfaces 46. A brace 48 is provided having a first end 50 pivotally connected to the upper part 20 of one of the frame members 16 and has a free second end 52 which can seat against the stop 46 to provide support.

A head harness 54 is connected to the frame assembly 12. Preferably, the harness 54 is removably connected and height adjustable. There is a sleeve 56 mounted to the periphery of the platform 28 and includes a threaded tightener 58 thereon for securing a bar 60 of the harness 54.

A method of for showing an animal contemplated by the instant invention includes providing a power lift platform having a scissors frame arrangement having a first pair of parallel frame members and a second pair of parallel frame members wherein a pivotal connection is formed between each of the first pair of parallel frame members and each of the second pair of parallel frame members defining an upper part and a lower part for each of the frame members about the pivotal connection, a platform attached to the upper parts of the first pairs of parallel frame members and the second pairs of parallel frame members, an axle operably connected to a lower part of each of the first pair of parallel frame members, a pair of wheels operably connected to the axle, a first cross bar connecting to a lower part of each of the second pair of parallel frame members, a second cross bar connecting between and to lower parts of the first pairs of parallel frame members upward from and adjacent the axle, the lower part of one of the first frame members includes at least one stop surface, a rechargeable battery operably disposed on the second cross bar, a third cross bar connecting between and to upper parts of the second pairs of parallel frame members, an electric linear actuator pivotally interconnecting the second cross bar and third cross bar, a reverse polarity switch operably connected to the stand for controlling power of the battery and extension and contraction of the actuator such that the platform is selectively positionable between a lowered position and a raised position, The method provides for loading an animal onto the power lift platform, raising said platform to a raised position using the switch, and upon reaching a desired height, positioning the second end of the brace against the stop surface.

While the embodiment of the invention has been disclosed above, many other embodiments and variations are possible within the scope of the present disclosure and in the appended claims that follow. Accordingly, the details of the preferred embodiment and example provided is not to be construed as limiting. It is to be understood that the terms used herein are merely descriptive rather than limiting and that various changes, numerous equivalents may be made without departing from the spirit or scope of the claimed invention.

What is claimed is:

1. A power lift platform, which includes:
    a scissors frame arrangement having a first pair of parallel frame members and a second pair of parallel frame members wherein a pivotal connection is formed between each of said first pair of parallel frame members and each of said second pair of parallel frame members defining an upper part and a lower part for each of said frame members about said pivotal connection;
    a platform attached to said upper parts of said first pairs of parallel frame members and said second pairs of parallel frame members;
    an axle operably connected to a lower part of each of said first pair of parallel frame members;
    a pair of wheels operably connected to said axle;
    a first cross bar connecting to a lower part of each of said second pair of parallel frame members;
    a second cross bar connecting between and to lower parts of said first pairs of parallel frame members upward from and adjacent said axle;
    a rechargeable battery operably disposed on said second cross bar;
    a third cross bar connecting between and to upper parts of said second pairs of parallel frame members;
    an electric linear actuator pivotally interconnecting said second cross bar and third cross bar;
    a reverse polarity switch operably connected to said stand for controlling power of said battery and extension and contraction of said actuator such that said platform is selectively positionable between a lowered position and a raised position.

2. The power lift platform of claim 1, wherein said actuator is disposed underneath said platform.

3. The power lift platform of claim 1, wherein said lower part of one of said first frame members includes at least one stop surface.

4. The power lift platform of claim 3, further includes a brace having a first end pivotally connected to said upper part of one of said frame members and has a free second end selectively seated against said at least one stop surface to provide support to said platform.

5. The power lift platform of claim 1, wherein which further includes a head harness connected to said platform.

6. The power lift platform of claim 5, wherein said harness is removably connected.

7. The power lift platform of claim 5, wherein said harness is height adjustable.

8. The power lift platform of claim 1, which includes a plurality of stake holders disposed about a periphery of said platform.

9. The power lift platform of claim 8, which includes a plurality of stakes removably inserted into said stake holders to form a retention area on said platform.

10. A method of for showing an animal, which includes the steps of:
    providing a power lift platform having a scissors frame arrangement having a first pair of parallel frame members and a second pair of parallel frame members wherein a pivotal connection is formed between each of said first pair of parallel frame members and each of said second pair of parallel frame members defining an upper part and a lower part for each of said frame members about said pivotal connection, a platform attached to said upper parts of said first pairs of parallel frame members and said second pairs of parallel frame members, an axle operably connected to a lower part of each of said first pair of parallel frame members, a pair of wheels operably connected to said axle, a first cross bar connecting to a lower part of each of said second pair of parallel frame members, a second cross bar connecting between and to lower parts of said first pairs of parallel frame members upward from and adjacent said axle, said lower part of one of said first frame members includes at least one stop surface, a rechargeable battery operably disposed on said second cross bar, a third cross bar connecting between and to upper parts of said second pairs of parallel frame members, an electric linear actuator pivotally interconnecting said second cross bar and third cross bar, a reverse polarity switch operably connected to said stand for controlling power of said battery and extension and contraction of said actuator such that said platform is selectively positionable between a lowered position and a raised position, loading an animal onto said power lift platform, raising said platform to a raised position using said switch, and upon reaching a desired height, positioning a second end of a brace against said stop surface.

* * * * *